United States Patent
Ayachit et al.

(10) Patent No.: US 10,567,542 B2
(45) Date of Patent: Feb. 18, 2020

(54) METHOD FOR STATE BASED SNAPSHOT DIFFERENCE WITH RESTART CAPABILITY

(71) Applicant: EMC IP Holding Company LLC, Hopkinton, MA (US)

(72) Inventors: Prajakta Balkrishna Ayachit, Pune (IN); George Mathew, Belmont, CA (US); Ajith Krishnamurthy, Bangalore (IN); Krithika Subramanian, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 25 days.

(21) Appl. No.: 16/146,519

(22) Filed: Sep. 28, 2018

(65) Prior Publication Data

US 2019/0037045 A1 Jan. 31, 2019

Related U.S. Application Data

(63) Continuation of application No. 15/653,159, filed on Jul. 18, 2017, now Pat. No. 10,116,764.

(51) Int. Cl.
*G06F 12/00* (2006.01)
*H04L 29/08* (2006.01)
*G06F 16/11* (2019.01)
*G06F 13/00* (2006.01)
(Continued)

(52) U.S. Cl.
CPC ........ *H04L 67/2852* (2013.01); *G06F 16/128* (2019.01); *H04L 67/1095* (2013.01); *H04L 67/2857* (2013.01); *G06F 3/0604* (2013.01); *G06F 3/067* (2013.01); *G06F 3/0646* (2013.01); *H04L 67/1097* (2013.01)

(58) Field of Classification Search
CPC ............. G06F 17/30088; G06F 3/0646; G06F 3/0604; G06F 3/067; H04L 67/2852; H04L 67/1097
See application file for complete search history.

(56) References Cited

U.S. PATENT DOCUMENTS

| 5,963,959 | A | 10/1999 | Sun et al. |
| 6,085,298 | A | 7/2000 | Ohran |
| 2005/0102558 | A1 | 5/2005 | Tiittanen et al. |

(Continued)

OTHER PUBLICATIONS

Author unknown; "Open VPN website how to section"; OpenVPN Technologies, Inc; https://web.archive.org/web/20150806052927/https://openvpn.net/index.php/open-sourceldocumentation/howto.html; Aug. 6, 2015.

*Primary Examiner* — Mark A Giardino, Jr.
(74) *Attorney, Agent, or Firm* — Chamberlain, Hrdlicka, White, Williams & Aughtry

(57) ABSTRACT

A data management device includes a buffer and a processor. The processor may select an unprocessed full key and generate a buffer entry based on a difference between an entry of a local snapshot specified by the unprocessed full key and an entry of a previous local snapshot specified by the unprocessed full key. The processor may make a first determination that a lookup key entry associated with the unprocessed full key is different than a lookup key entry associated with a processed full key. The process may add the generated buffer entry to the buffer after processing the buffer in response to the first determination.

20 Claims, 8 Drawing Sheets

(51) Int. Cl.
    *G06F 13/28*    (2006.01)
    *G06F 3/06*     (2006.01)

(56) References Cited

U.S. PATENT DOCUMENTS

| | | |
|---|---|---|
| 2005/0177772 A1 | 8/2005 | Derks et al. |
| 2008/0034176 A1 | 2/2008 | Akutsu et al. |
| 2009/0217109 A1* | 8/2009 | Sekaran ............... H04L 41/147 |
| | | 714/49 |
| 2010/0257255 A1* | 10/2010 | Phillips ............... H04L 67/125 |
| | | 709/219 |
| 2011/0209064 A1 | 8/2011 | Jorgensen |
| 2014/0149698 A1 | 5/2014 | Ezra et al. |
| 2015/0052108 A1 | 2/2015 | Volk et al. |
| 2017/0017907 A1 | 1/2017 | Narasimhan |
| 2017/0109243 A1 | 4/2017 | Kumar |

* cited by examiner

METHOD FOR STATE BASED SNAPSHOT DIFFERENCE WITH RESTART CAPABILITY

BACKGROUND

Computing devices generate, use, and store data. The data may be, for example, images, document, webpages, or meta-data associated with any of the files. The data may be stored locally on a persistent storage of a computing device and/or may be stored remotely on a persistent storage of another computing device. Multiple copies of the data may be stored in separate computing devices to improve the likelihood of the data being preserved in the event of failure of one or more computing devices.

SUMMARY

In one aspect, a data management device in accordance with one or more embodiments of the invention includes a buffer and a processor. The processor may select an unprocessed full key, generate a buffer entry based on a difference between an entry of a local snapshot specified by the unprocessed full key and an entry of a previous local snapshot specified by the unprocessed full key, make a first determination that a lookup key entry associated with the unprocessed full key is different than a lookup key entry associated with a processed full key, and add the generated buffer entry to the buffer after processing the buffer in response to the first determination.

In one aspect, a method of operating a data management device in accordance with one or more embodiments of the invention includes selecting, by the data management device, an unprocessed full key, generating, by the data management device, a buffer entry based on a difference between an entry of a local snapshot specified by the unprocessed full key and an entry of a previous local snapshot specified by the unprocessed full key, make a first determination, by the data management device, that a lookup key entry associated with the unprocessed full key is different than a lookup key entry associated with a processed full key, and adding, by the data management device, the generated buffer entry to a buffer after processing the buffer in response to the first determination.

In one aspect, a non-transitory computer readable medium in accordance with one or more embodiments of the invention includes computer readable program code, which when executed by a computer processor enables the computer processor to perform a method for operating a data management device, the method includes selecting, by the data management device, an unprocessed full key, generating, by the data management device, a buffer entry based on a difference between an entry of a local snapshot specified by the unprocessed full key and an entry of a previous local snapshot specified by the unprocessed full key, make a first determination, by the data management device, that a lookup key entry associated with the unprocessed full key is different than a lookup key entry associated with a processed full key, and adding, by the data management device, the generated buffer entry to a buffer after processing the buffer in response to the first determination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
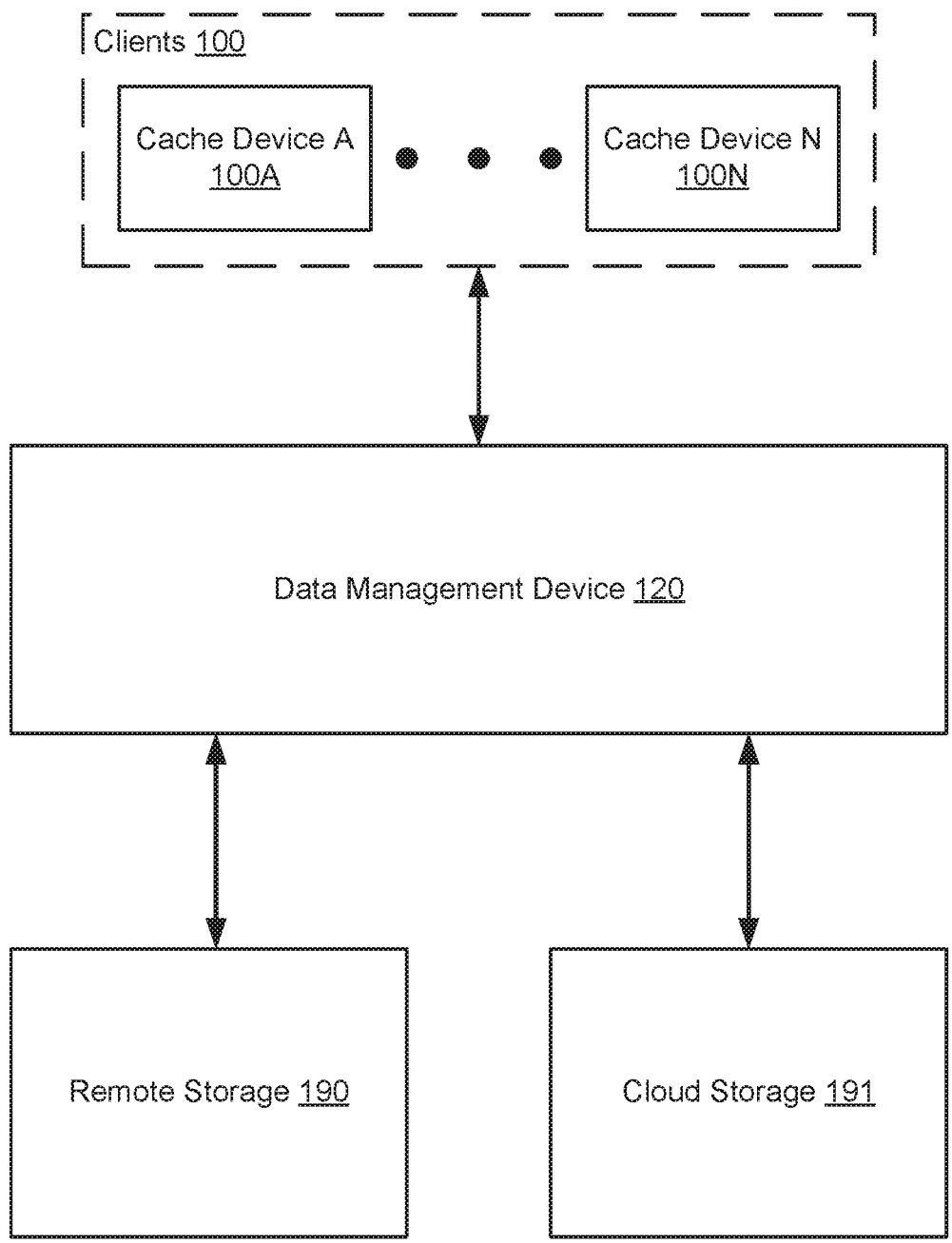
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to devices, methods, and systems for operating a data management device. The data management device may include a data storage for storing data. A copy of the data stored in the data storage may be stored in a remote storage that is separate from the data management device.

In one or more embodiments of the invention, the data management device may store the copy of the data to the remote storage by sending incremental changes to the data that have occurred since a copy of the data was last sent to the remote storage. To facilitate calculating the incremental changes, the data management device may include a local snapshot that describes the data stored in the data storage and a previous local snapshot that describes the data stored in the remote storage, i.e., the backed up data.

In one or more embodiments of the invention, the data management device may calculate incremental changes for portions of the data stored in the data storage, send the incremental changes, and then verify that the incremental changes for the portion have been applied by the remote storage. The aforementioned process may be repeated until incremental changes for all portions of the data stored in the local data storage have been calculated, sent, and applied by the remote storage.

In one or more embodiments of the invention, the data management device may exchange a cookie, or other identifier, with the remote storage when the remote storage crashes, other otherwise becomes unavailable due to network issues that prevent data transfer, while attempting to apply the incremental changes. The cookie may specify a key or other identification information that enables the data management device to determine which portion of the incremental changes previously sent to the remote storage have been applied by the remote storage before the crash. The data management device may then continue to calculate incremental changes for portions of data without resending any incremental changes that were applied by the remote storage before the crash.

In one or more embodiments of the invention, the data management device may filter the incremental changes before sending the incremental changes to the remote storage. Filtering the incremental changes before sending the incremental changes may reduce the number of incremental changes sent. The incremental changes may be filtered based on one or more criteria. Any incremental changes matching the criteria may be modified based on the match.

FIG. 1 shows a system in accordance with one or more embodiments of the invention. The system includes clients (100) that store data via a data management device (120). The data management device (120) may provide data redundancy by storing the data locally, i.e., in a local storage of the data management device (120) or a cloud storage (191) operably connected to the data management device (120), and storing a copy of the data in a remote storage (190).

Each of the aforementioned components of the system may be operably connected to each other via network connections. The network connections may be of any type. For example, the network connections may facilitate internet protocol (IP) communications via the Internet. The network connections may be other types of connections and may utilize other types of network without departing from the invention. Each component of the system is discussed below.

The clients (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application.

More specifically, the clients (100) may be programmed, i.e., include computer code executed by a processor, to store data via the data management device (120). The clients (100) may send data storage requests to the data management device (120) that specify the data to-be-stored. The data storage requests may include a file name or other identifier that the data management device (120) will associate with the stored data.

The clients (100) may also be programmed to obtain stored data via the data management device (120). The clients (100) may send data access requests to the data management device (120) that specify the to-be-stored stored data. The data access requests may include a file name or other identifier that enables the data management device (120) to identify the requested data in the data of the data management device (120).

The remote storage (190) may be a physical device for storing data. The physical devices may be, for example, hard disk drives, solid state drives, tape drives, or any other type of persistent storage media. The remote storage (190) may store a backup of the data stored by the data management device (120)

The remote storage (190) may be a logical storage for storing data. The logical storage may be implemented using, for example, hard disk drives, solid state drives, tape drives, or any other type of persistent storage media. The logical storage may aggregate the resources of the physical disk drives and present the aggregated storage as a single logical storage.

The remote storage (190) may be cloud resources. The cloud resources may be a logical storage that includes any number of physical storage devices distributed across any number of computing devices and operable linked and/or unified to form the logical storage. The logical storage may include redundancy or other data integrity features that ensure that failure of any of the physical storage elements does not cause data stored in the logical storage to be lost. The physical resources of the logical storage of the cloud resources may be physically separated across a number of computing devices other than the data management device (120) that are each operably connected to the data management device (120).

The cloud storage (191) may be a physical device for storing data. The physical devices may be, for example, hard disk drives, solid state drives, tape drives, or any other type of persistent storage media. The cloud storage (191) may be operably, connected to the data management device (120). The cloud storage (191) may store a portion of the data managed by the data management device (120)

The cloud storage (191) may be a logical storage for storing data. The logical storage may be implemented using, for example, hard disk drives, solid state drives, tape drives, or any other type of persistent storage media. The logical storage may aggregate the resources of the physical disk drives and present the aggregated storage as a single logical storage.

The cloud storage (191) may be cloud resources. The cloud resources may be a logical storage that includes any number of physical storage devices distributed across any number of computing devices and operable linked and/or unified to form the logical storage. The logical storage may include redundancy or other data integrity features that ensure that failure of any of the physical storage elements does not cause data stored in the logical storage to be lost. The physical resources of the logical storage of the cloud resources may be physically separated across a number of computing devices other than the data management device (120) that are each operably connected to the data management device (120).

The data management device (120) may manage client data. More specifically, the data management device (120)

may store a copy of client data in the remote storage (190) in addition to managing the client data.

The data management device (120) may be a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and illustrated in at least FIGS. 2A-3. The data management device (120) may be other types of computing devices without departing from the invention.

Figure 1B:
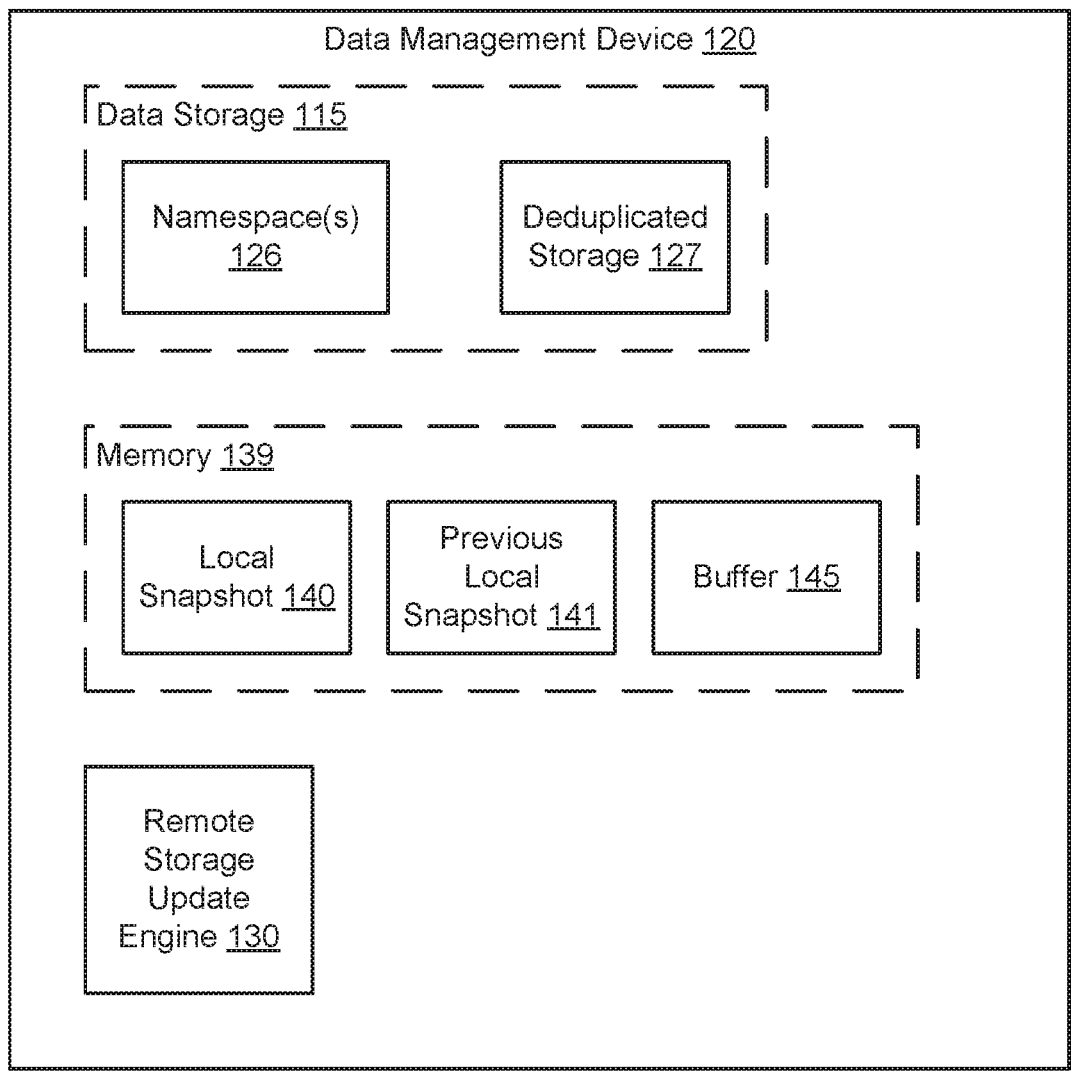
FIG. 1B shows a first diagram of data management device in accordance with one or more embodiments of the invention.

FIG. 1B shows a diagram of a data management device (120) in accordance with one or more embodiments of the invention. The data management device (120) may include a data storage (115), a memory (139), and a remote storage update engine (130). Each component of the data management device (120) is discussed below.

The data management device (120) may include a data storage (115). The data storage may include namespace(s) (126) that allocate the data storage resources of one or more local storages of the data management device and the data storage resources of the cloud storage (191).

The data storage (115) may also include a deduplicated storage (127). As used herein, a deduplicated storage refers to a storage that attempts to reduce the required amount of storage space to store data by not storing multiple copies of the same files or bit patterns. Rather, when a new file or bit pattern is sent to the data storage (115) for storage, the data storage (115) may compare all or a portion of the new file or bit pattern to files or bit patterns already stored in the data storage (115). If the new file or bit pattern, or a portion thereof, matches a file or bit pattern, or a portion thereof, already stored in the data storage (115), the new file or bit pattern, or portion thereof, is not stored in the data storage (115) and the already stored file or bit pattern, or portion thereof, is associated with the filename included in the data storage request for later retrieval.

In one or more embodiments of the invention, a file or bit pattern stored in the data storage (115) may be associated with multiple clients. For example, if a first client requests that a unique file be stored in the data storage (115), the data storage (115) will store the unique file and only associate the stored unique file with the first client. For example, a namespace associated with the first client maybe updated to include the stored unique file and/or segments of the file. However, if a second client requests that the unique file be stored in the data storage (115) after the unique file is already stored in the data storage (115), the data storage (115) will not store a second copy of the unique file in the data storage (115) but will associate the already stored file stored by the first client with the second client.

Thus, if a first client and a second client have requested that a unique file be stored in the data storage (115), each of the clients' file names for the unique file, or other identification information, will be associated with the stored unique file. Thus, the data of the stored unique file may be retrieved from the data storage (115) using any filename (or other identifier) given to the file by a client that requested that the unique file be stored in the data storage (115).

The namespace(s) (126) may be used to organize the storage of the deduplicated storage. Specifically, the namespace(s) (126) may include keys that represent the data stored in the deduplicated storage (127) or groupings of data stored in the deduplicated storage (127).

In one or more embodiments of the invention, the namespace(s) (126) may be organized as a B+ tree. The B+ tree may be indexed using a plurality of look up keys. Each of the look up keys may be associated with nodes of the B+ tree that are not associated with data. Rather, some of the nodes that are indexable via the look up keys may specify other nodes. These other nodes may each be associated with different portions of the data stored in the deduplicated storage (127) or nodes that only specify other nodes. Thus, indexing using a look up key may provide access to a group of other nodes and some of which be may be associated with data.

Each of the nodes of the B+ tree that are associated with different portions of the data stored in the deduplicated storage (127) may be indexable using a full key. Thus, indexing using a full key may provide access to the data associated with the corresponding node via the information included in the node. For additional details regarding the relationship between look up keys, full keys, and the data stored in the deduplicated storage (127), See FIG. 1D.

The data management device (120) may include a memory (139). The memory (139) may store a local snapshot (140) that represents the namespace that organizes the data stored in the deduplicated storage (127) at a point in time, a previous local snapshot (141) that represents the namespace that organizes data stored in the deduplicated storage (127) at a second point in time, and a buffer (145) that includes entries that represent differences between the local snapshot (140) and the previous local snapshot (141) for keys. While illustrated as being stored in a memory, e.g., random access memory, each of the aforementioned data structures may be stored on persistent storage or a combination of memory and persistent storage without departing from the invention. Each of the aforementioned data structures is discussed below.

The local snapshot (140) may be a data structure. The local snapshot (140) may represent the namespace that organizes the data stored in the deduplicated storage (127) at a first point in time. The local snapshot (140) may be used by the remote storage update engine (130) to compute differences between the local snapshot (140) and the previous local snapshot (141).

As previously discussed, the deduplicated storage (127) may utilize storage resources, e.g., disk drives, of the data management device (120) and a cloud storage hosted by different computing device. Thus, the local snapshot (140) may be a representation of the namespace for data stored in the data management device (120) and one or more different computing devices.

The previous local snapshot (141) may be a data structure. The previous local snapshot (141) may represent the namespace that organizes the data stored in the local storage at a point in time earlier than at the point in time the local snapshot represents. The remote storage may store a copy of the data of the object storage that mirrors the object storage at the point in time earlier than the point in time the local snapshot represents, i.e., mirrors the data of the object storage at the time the previous local snapshot (141) was generated. The first point in time may be at a later point in time than the first snapshot. The previous local snapshot (141) may be used by the remote storage update engine (130) to compute differences between the local snapshot (140) and the previous local snapshot (141). The computed differences may then be used by the remote storage to update the data stored in the remote storage to mirror the data stored in the deduplicated storage (127) at the first point in time.

The buffer (145) may be a data structure. The buffer (145) may include entries that include differences between the local snapshot (140) and the previous local snapshot (141). The contents of the buffer may be forwarded to the remote storage. For additional details regarding the buffer, See FIG. 1C.

The data management device (120) may include a remote storage update engine (130). The remote storage update engine may generate entries of the buffer (145) and/or coordinate with the remote storage to update the remote storage.

Additionally, the remote storage update engine (130) may generate the local snapshot (140). The local snapshot (140) may be generated based on the data stored in the deduplicated storage (127) and/or the namespace(s) (126) used to organize the deduplicated storage (127). The remote storage update engine (130) may generate a local snapshot (140) once all of the differences between a previously generated local snapshot (140) and a previous local snapshot (141) have been computed, sent to the remote storage, and applied by the remote storage. A new previous local snapshot (141) may be calculated by copying the local snapshot (140).

In one or more embodiments of the invention, a new local snapshot may be generated after a predetermined number of changes or activities of the object storage (130) have been performed. For example, the new local snapshot may be not generated when all of the differences between a previously generated local snapshot (140) a previous local snapshot (141) have been computed, sent to the remote storage, and applied by the remote storage unless a predetermined number of files have been stored in the object storage after the point in time associated with the local snapshot (140). For example, 10 files may need to be stored after the point in time associated with the local snapshot (140) before a new local snapshot (140) is generated. In one or more embodiments of the invention, at least one file may need to be stored/modified/deleted after the point in time associated with the local snapshot (140) before a new local snapshot (140) is generated.

In one or more embodiments of the invention, the remote storage update engine (130) may be a physical device. The physical device may include circuitry. The physical device may be, for example, a field-programmable gate array, application specific integrated circuit, programmable processor, microcontroller, digital signal processor, or other hardware processor. The physical device may be adapted to provide the functionality described above and to perform the methods shown in FIGS. 2A-3.

In one or more embodiments of the invention, the remote storage update engine (130) may be implemented as computer instructions, e.g., computer code, stored on a persistent storage that when executed by a processor of the remote storage update engine (130) cause the data management device (120) to provide the functionality described above and perform the methods shown in FIGS. 2A-3.

Figure 1C:
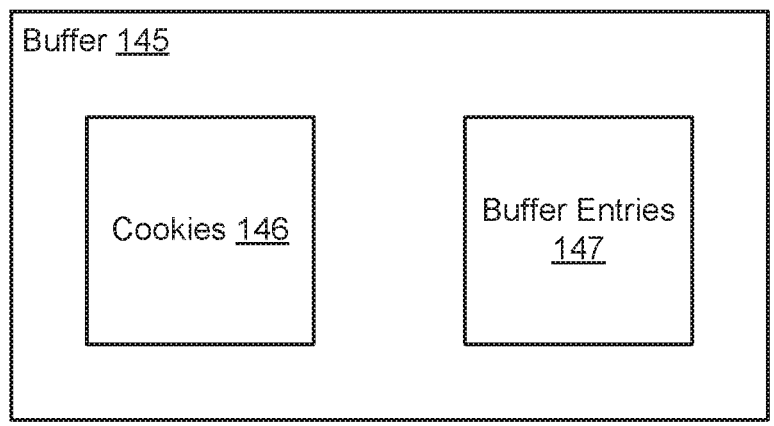
FIG. 1C shows a diagram of a buffer in accordance with one or more embodiments of the invention.

As discussed above, the remote storage update engine (130) may generate entries of the buffer. FIG. 1C shows a diagram of a buffer (145) in accordance with one or more embodiments of the invention. The buffer (145) may be a data structure stored in memory and may include one or more cookies (146) and one or more buffer entries (147).

The cookies (146) may specify look up keys or full keys. When computing the buffer entries (147), the remote storage update engine (130) may only compute buffer entries for a range of keys. The cookies (146) may be used to specify where the range begins, ends, or which keys the range includes. For example, a lookup key may specify a range of full keys while a full key may specify a beginning, an end, or an intermediary point within a range of keys. More specifically, a full key may be associated with a lookup key. The lookup key may specify the range, i.e., the full keys associated with the lookup key, while the full key may specify a particular key within the range and thereby specify a start, end, or intermediary point within the range.

The buffer entries (147) may specify differences between the local snapshot and the previous local snapshot. More specifically, each buffer entry of the buffer entries (147) may specify an addition, deletion, or modification of the previous local snapshot to mirror the local snapshot.

In one or more embodiments of the invention, buffer entries (147) corresponding to a range of keys may be generated. Once generated, the buffer entries (147) may be sent to the remote storage. The buffer entries (147) may be empties and buffer entries (147) corresponding to another range of keys may be generated. The aforementioned process may be repeated until buffer entries (147) corresponding to the complete range of keys have been generated and sent to the remote storage.

In one or more embodiments of the invention, buffer entries (147) may be not generated for data of the local snapshot and corresponding data of the previous local snapshot that is the same. In other words, buffer entries (147) are not generated unless there is a difference between the local snapshot and the previous local snapshot.

Figure 1D:
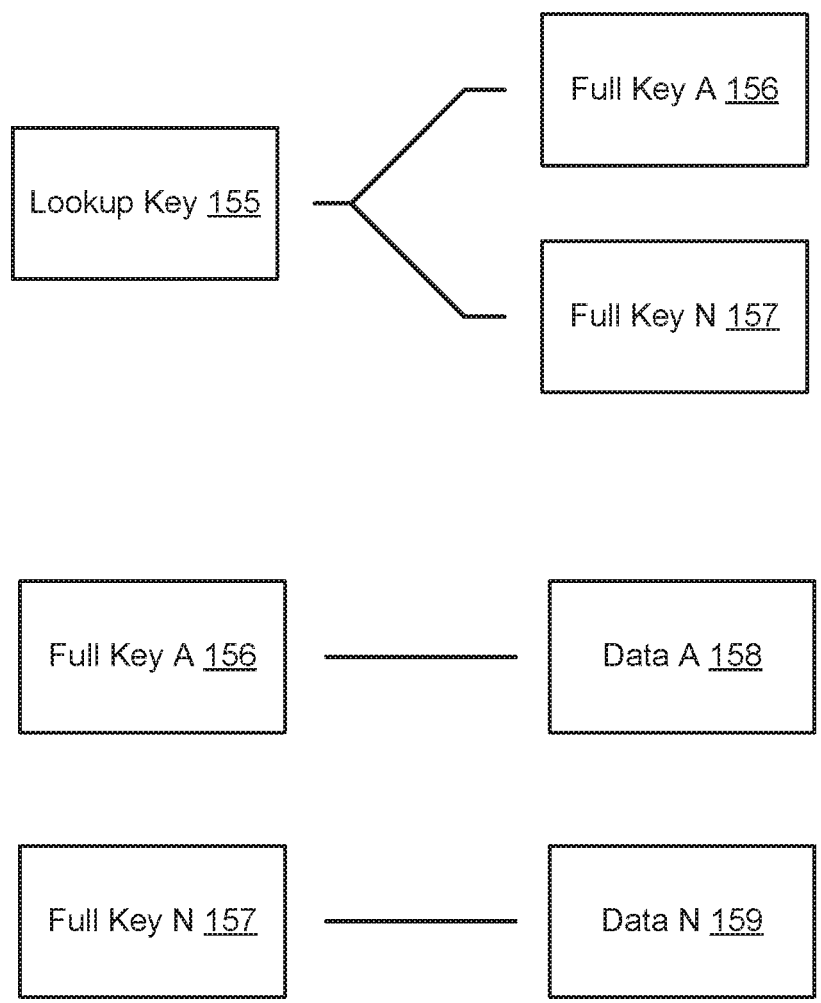
FIG. 1D shows a diagram of relationships between lookup keys, full keys, and data in accordance with one or more embodiments of the invention.

As discussed above, the deduplicated storage may be indexed using different types of keys. FIG. 1D illustrates mappings between different types of keys and data of the deduplicated storage. As seen from the illustration, a lookup key (155) may map to any number of full keys (156, 157).

In one or more embodiments of the invention, one lookup key maps to 10 full keys on average. In one or more embodiments of the invention, one lookup key maps to more than 5 full keys and less than 20 full keys on average.

Additionally, as seen from the illustration, a full key maps to a single piece of data stored in the deduplicated storage. For example, full key A (156) maps to data A (158) of the deduplicated storage and full key N (157) maps to data N (159) of the deduplicated storage. Thus, the full keys maps one to one mappings to data while the lookup keys are one to N mappings to full keys or other lookup keys.

Figure 2A:
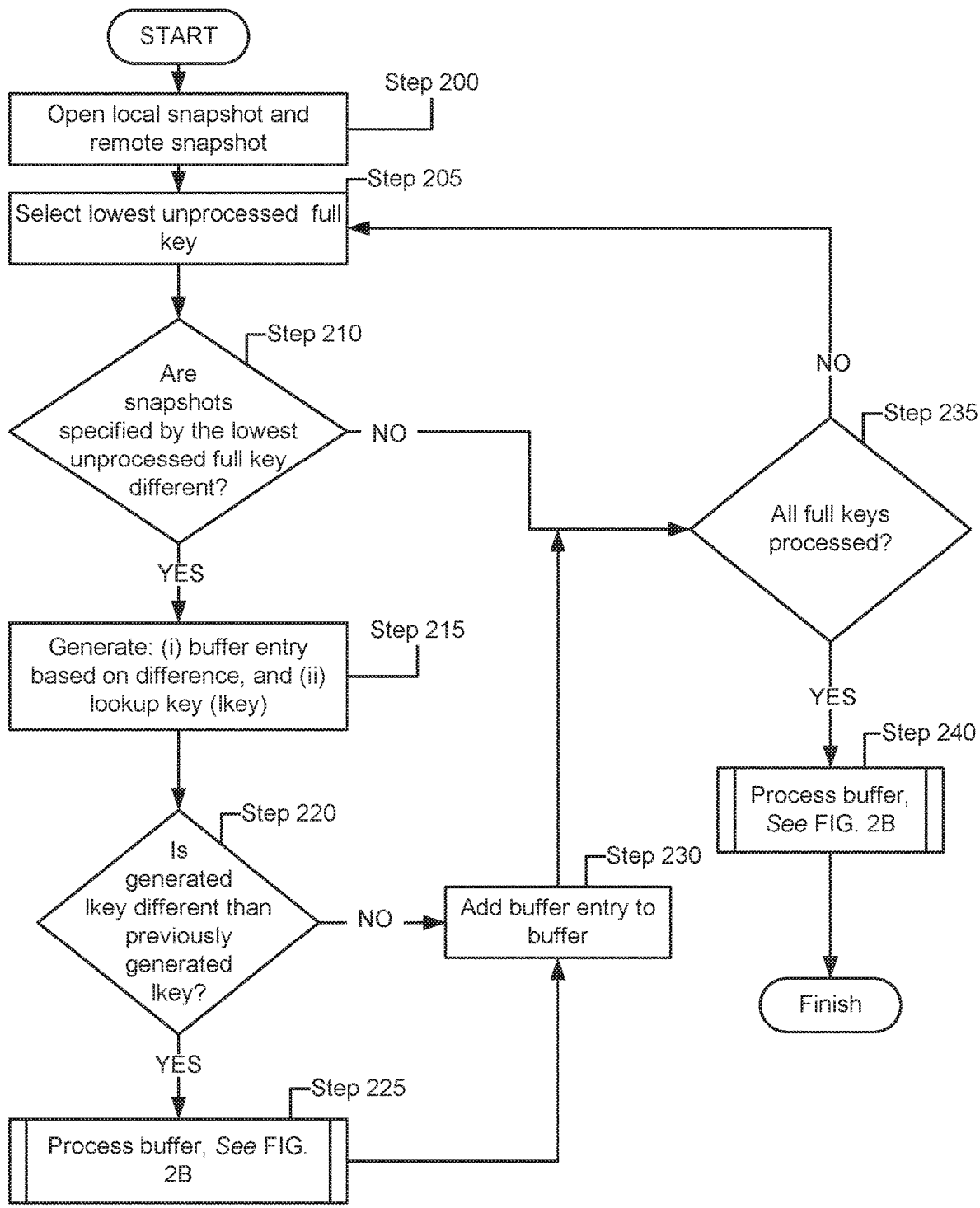
FIG. 2A shows a flowchart of a method of updating a remote storage in accordance with one or more embodiments of the invention.
Figure 2B:
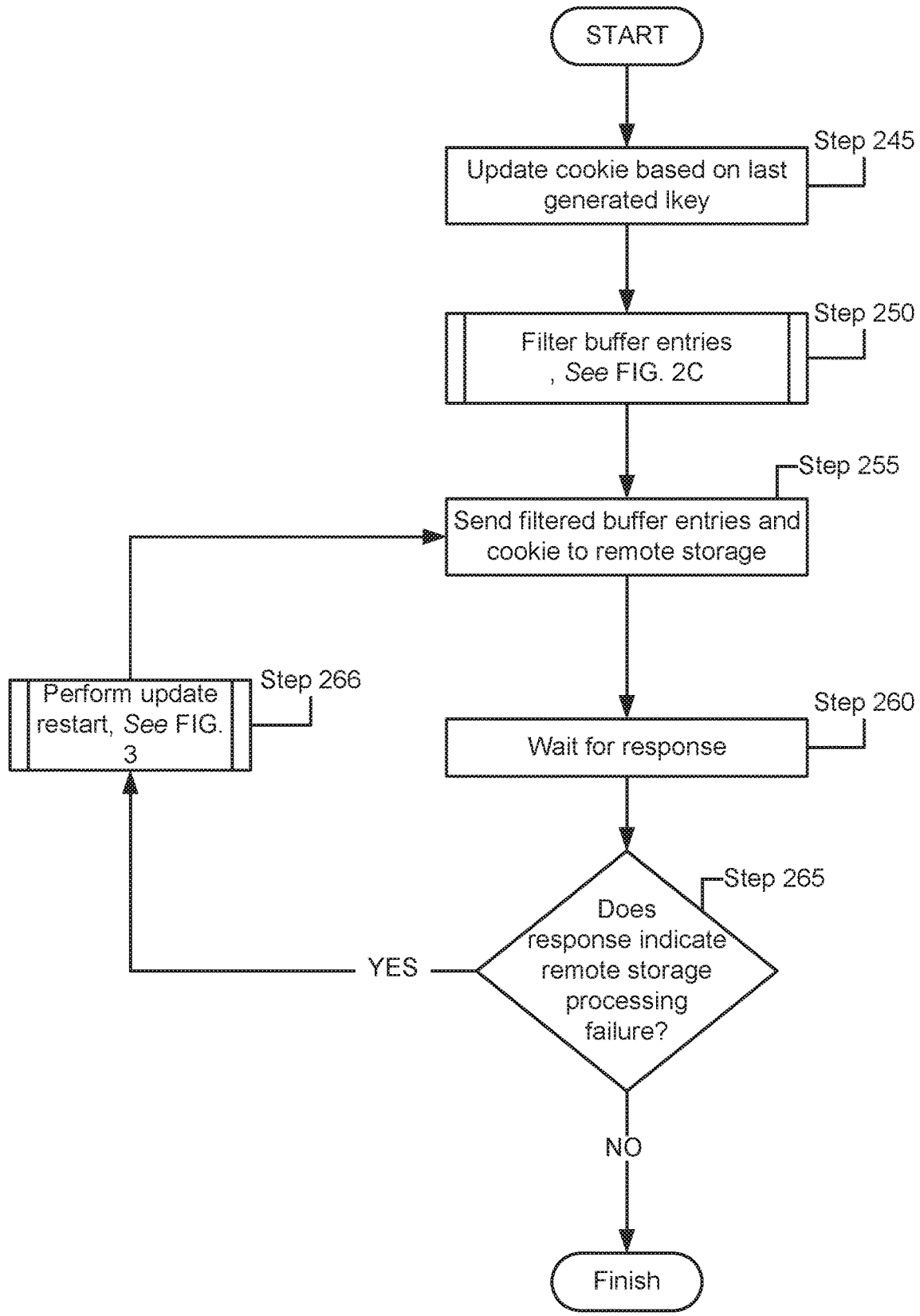
FIG. 2B shows a flowchart of a method of processing a buffer in accordance with one or more embodiments of the invention.
Figure 2C:
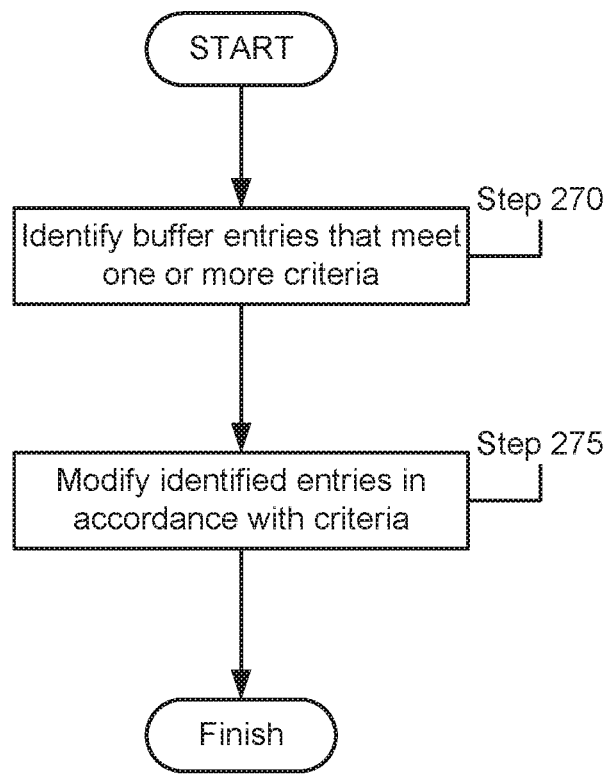
FIG. 2C shows a flowchart of a method of filtering a buffer in accordance with one or more embodiments of the invention.
Figure 3:
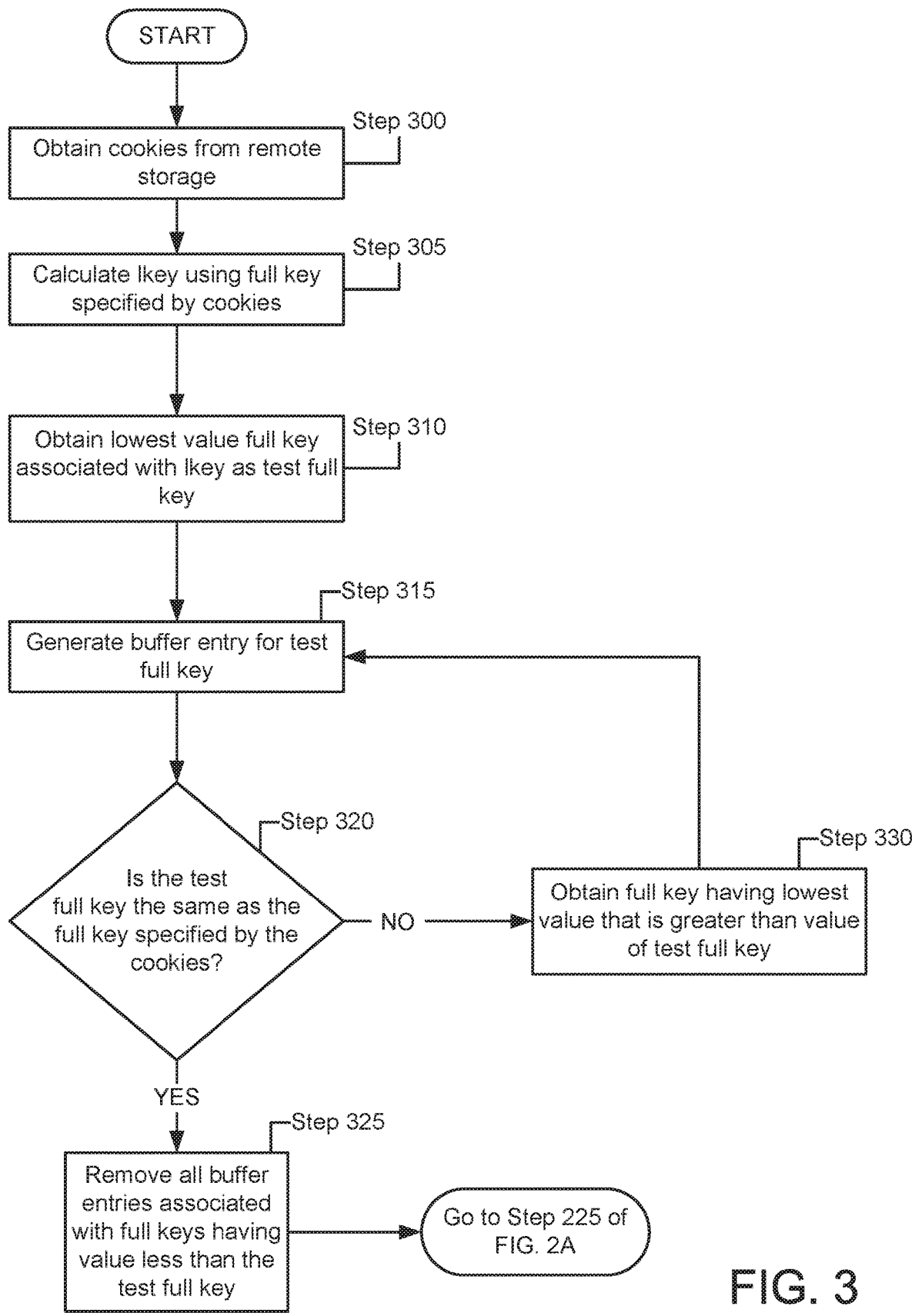
FIG. 3 shows a flowchart of a method of restarting an update of a remote storage following a crash of a remote storage in accordance with one or more embodiments of the invention.

FIGS. 2A-3 show flowcharts of methods that may be performed by the data management device of FIG. 1A, More specifically, FIGS. 2A-2C illustrate a method of updating a remote storage and FIG. 3 illustrates a modification of the methods illustrated in FIGS. 2A-2C to handle crashes of the remote storage while updating the remote storage.

FIG. 2A shows a flowchart of a method in accordance with one or more embodiments of the invention. The method depicted in FIG. 2A may be used to update a remote storage in accordance with one or more embodiments of the invention. The method shown in FIG. 2A may be performed by, for example, a data management device (120, FIG. 1B) and in some embodiments of the invention may be performed by a remote storage update engine (130) of the data management device.

In Step 200, a local snapshot and a previous local snapshot are opened.

In one or more embodiments of the invention, opening the local snapshot and the previous local snapshot may be performed by loading a portion of the snapshots into memory. For example, a portion of the snapshots corresponding to a range of keys may be loaded into memory.

In one or more embodiments of the invention, the local snapshot and the previous local snapshot may be stored on a persistent storage of the data storage device prior to being opened.

In one or more embodiments of the invention, the local snapshot and the previous local snapshot may be stored on a persistent storage of another computing device operably connected to the data storage device prior to being opened.

In Step 205, the lowest unprocessed full key of the open snapshots is selected.

In Step 210, it is determined whether the snapshots specified by the lowest unprocessed full key are different. More specifically, the portions of each of the local snapshot and previous local snapshot are compared to determine whether an additional, removal, or modification has been made based on any difference between the snapshots. If there is a difference, the method proceeds to Step 215. If there is not a difference, the lowest unprocessed full key is marked as processed and the method proceeds to Step 235.

In one or more embodiments of the invention, the lowest unprocessed full key is marked as processed by incrementing a bookmark. All of the keys of both snapshots may have numerical values that are increasing. The bookmark may specify the numerical value of a full key. All full keys having a value less than that of the bookmark may be considered to be marked as processed. All full keys having a value greater than that of the bookmark may be considered to be unprocessed.

In Step 215, a (i) buffer entry based on the difference determined in Step 210 is generated and (ii) a lookup key is generated. The lookup key may be generated by identifying a lookup key associated with multiple full keys including the full key of the lowest unprocessed full key.

In one or more embodiments of the invention, the buffer entry may specify a modification of the portions of the previous local snapshot specified by the lowest unprocessed key to be identical to the portion of the local snapshot specified by the lowest unprocessed key.

In one or more embodiments of the invention, the change may include a type change. For example, when the previous local snapshot was created, a particular piece of data may be stored in a local storage of the data management device. A key type associated with data stored in the data management device may be a direct key type, i.e., a key type that indicates storage of the data on a local storage device. Subsequent to the creation of the previous local snapshot, the data may be moved to a cloud storage. Moving the data to the cloud storage may change the key type from a direct to an indirect key type, i.e., a key type that indicates storage of the data on storage device of a computing device other than the data management device. When a local snapshot is generated, there is now a difference between the key type of the particular data specified by the previous local snapshot, i.e., direct key type, and the key type of the particular data specified by the local snapshot, i.e., indirect key type.

In Step 220, it is determined whether the generated lookup key is different from the previously generated lookup key.

As discussed above and with respect to FIG. 1D, a lookup key may be mapped to multiple full keys. Thus, multiple full keys may each be used to generate the same lookup key. As lookup keys are generated in Step 215, the current and previously generated lookup keys may be saved. The saved keys may then be compared in Step 220 to determine whether the generated and previous lookup keys are different.

If the generated lookup key is different from the previous lookup key, the method may proceeds to Step 225. If the generated lookup key is the same as the previously generated lookup key, the method may proceed to Step 230.

In Step 225, the buffer is processed. The buffer may be processed using the method shown in FIG. 2B.

In one or more embodiments of the invention, processing the buffer includes sending the entries of the buffer to a remote storage, confirming that the entries of the buffer have been processed, and/or emptying the buffer after confirming that the sent entries have been processed.

In Step 230, the generated buffer entry is added to the buffer.

In Step 235, it is determined whether all of the full keys are processed. As discussed above, the full keys may sorted in increasing order and a bookmark may indicate which of the full keys have been processed. If all of the full keys have been processed, the method proceeds to Step 240. If all of the full keys have not been processed, the method proceeds to Step 205.

In Step 240, the buffer is processed. The buffer may be processed using the method shown in FIG. 2B.

In one or more embodiments of the invention, processing the buffer in Step 240 may process the remaining entries of the buffer that would not otherwise be processed in Step 225.

The method may end following Step 240.

As discussed with respect to FIG. 2A, the buffer may be processed when updating the remote storage. Processing the buffer may include filtering buffer entries, updating one or more cookies, and coordinating with the remote storage to verify that the buffer entries have been applied by the remote storage.

FIG. 2B shows a flowchart of a method in accordance with one or more embodiments of the invention. The method depicted in FIG. 2A may be used to update a remote storage in accordance with one or more embodiments of the invention. The method shown in FIG. 2A may be performed by, for example; a data management device (120, FIG. 1B) and in some embodiments of the invention may be performed by a remote storage update engine (130) of the data management device.

In Step 245, a cookie is updated based on the last generated lookup key. The cookie may include the last generated lookup key. The cookie may include additional information such as, for example, a time stamp or identifier of the cookie. The cookie may include other information without departing from the invention.

In Step 250, the entries of the buffer and filtered. As used herein, filtering the buffer entries means to modify, add, or delete entries of the buffer based on one more criteria. In one or more embodiments of the invention, the buffer may be filtered using the method shown in FIG. 2C.

In Step 255, the filtered buffer entries and the cookie are sent to the remote storage.

In Step 260, period of time may be waited until a response is received. If a response is not received during the period of time, the response may be considered to be a remote storage processing failure.

In Step 265, it is determined whether the response indicated a remote storage processing failure. As used herein, a remote storage processing failure indicates that the remote storage was unable to process the filtered buffer entries while attempting to processes the filtered buffer entries. The remote storage may not be able to processes the filtered buffer entries due to, for example, a crash of the remote storage during processing of the filtered buffer entries, a network communication error during the processing of the filtered buffer entries, and/or a flow control command issued to the remote storage that prevents the remote storage from processing the filtered buffer entries.

If the response indicates a remote processing failure, the method may proceed to Step 266. If the response does not indicate a remote processing failure, e.g., a response that indicates that the filtered buffer entries were processed by the remote storage, the method may end.

In one or more embodiments of the invention, the response that indicates a remote storage processing failure may include a cookie generated by the remote storage. The cookie generated by the remote storage may include a lookup key.

In Step 266, an update restart is performed. The update restart may be performed using the method illustrated in FIG. 3.

As discussed above, entries of the buffer may be filtered before the buffer is sent to the remote storage for processing. FIG. 2C shows a flowchart of a method in accordance with one or more embodiments of the invention. The method depicted in FIG. 2C may be used to filter entries of a buffer in accordance with one or more embodiments of the invention. The method shown in FIG. 2C may be performed by, for example, a data management device (120, FIG. 1B) and in some embodiments of the invention may be performed by a remote storage update engine (130) of the data management device.

In Step 270, entries of the buffer that meet a criteria are identified. The criteria may specify a type of change, a type of data, a location of the data, or any other type of characteristic specified by the buffer entry.

In one or more embodiments of the invention, the entries of the buffer may be compared to multiple, different criteria. Each criteria may be stored in list.

In one or more embodiments of the invention, a criteria of the list may be a change from a key type direct to a key type indirect.

In one or more embodiments of the invention, a criteria of the list may be a version, or other identifier, of the remote storage or the local storage that indicates a different between the storage architectures. The different storage architectures may run different versions of software, firmware, and/or control hardware that would cause the remote storage to be unable to properly processes the unfiltered incremental changes sent by the data management device.

In Step 275, the identified entries are modified in accordance with the criteria.

In one or more embodiments of the invention, a type of modification may be associated with each criterion in the list of criteria.

In one or more embodiments of the invention, the modification may be to remove a key type change. More specifically, buffer entries that include a key type change from direct to indirect key type may be modified to remove the key type change.

In one or more embodiments of the invention, the modification may be to remove the buffer entry.

In one or more embodiments of the invention, the modification may be to add a new buffer entry based on the buffer entry that triggered the criteria. The new buffer entry may have a key type that is different than the key type of the buffer entry that triggered the criteria.

The method may end following Step 275.

As discussed above, the remote storage may crash while processing buffers sent to the remote storage by the data management device. FIG. 3 shows a flowchart of a method in accordance with one or more embodiments of the invention. The method depicted in FIG. 3 may be used to restart an update of the remote storage after the remote storage crashes in accordance with one or more embodiments of the invention. The method shown in FIG. 3 may be performed by, for example, a data management device (120, FIG. 1B) and in some embodiments of the invention may be performed by a remote storage update engine (130) of the data management device.

In Step 300, cookies are obtained from the remote storage. The cookies may specify a full key. The cookies may be obtained by receiving them from the remote storage following a crash of the remote storage. The cookies may be obtained by, requesting them from the remote storage.

In Step 305, a lookup key is calculated using the full key specified by the cookies.

In Step 310, the lowest value full key associated with the calculated lookup key is obtained as a test full key.

In Step 315, a buffer entry using the value of the test full key is generated. The buffer entry may be generated by calculating a difference between the portions of the local snapshot and previous local snapshot specified by the value of the test full key.

In Step 320, it is determined whether the test full key is the same as the full key specified by the cookies. If the test full key is the same as the full key specified by the cookies, the method proceeds to Step 325, If the test full key is not the same as the full key specified by the cookies, the method proceeds to Step 330.

In Step 325, all buffer entries associated with full keys have values less than the value of the test full key are removed from the buffer. The method may proceed to Step 225 of FIG. 2A following Step 325.

In Step 330, a full key associated with the calculated lookup key having the lowest value that is greater than the value of the test full key is obtained. The method may proceed to Step 315 following Step 330.

One or more embodiments of the invention may be implemented using instructions executed by one or more processors in the data storage device. Further, such instructions may correspond to computer readable instructions that are stored on one or more non-transitory computer readable mediums.

One or more embodiments of the invention may enable one or more of the following: i) provide a method of updating a remote storage that may be restarted in the event of a crash of the remote storage during the update, ii) may reduce the computational resources required to update a remote storage by only sending changes that have not been applied by the remote storage even if the remote storage crashes during the update, and iii) improve the accuracy of the update by modifying changes so that data is of the data management device is still backed up by the remote storage even if the data is not stored in the data management device, e.g., in a cloud storage or other server utilized by the data management device for storage.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data management device, comprising:
a buffer; and
a processor programmed to:
identify a crash of a remote storage while processing the buffer, in response to identifying the crash:
  obtain cookies from the remote storage;
  calculate a lookup key using a full key specified by the cookies;
  obtain a lowest value full key specified by the cookies as a test full key;
  generate a buffer entry using a value of the test full key;
  make a determination that the test full key is the same as the full key specified by the cookies;
  in response to the determination:
    remove all entries of the buffer associated with full keys having values less than the value of the test full key to obtain a smaller buffer; and
    process the smaller buffer.

2. The data management device of claim 1, wherein generating the buffer entry using the value of the test full key comprises:
  calculating a difference between portions of a local snapshot and portions of a previous local snapshot that are both specified by the value of the test full key.

3. The data management device of claim 1, wherein the processor is further programmed to:
  identify a second crash of a remote second storage while processing the buffer,
  in response to identifying the second crash:
    obtain second cookies from the second remote storage;
    calculate a second lookup key using a second full key specified by the second cookies;
    obtain a second lowest value full key specified by the second cookies as a second test full key;
    generate a second buffer entry using a value of the second test full key;
    make a second determination that the second test full key is different from the second full key specified by the second cookies;
    in response to the second determination:
      obtain a third full key having a value that is greater than the value of the second test full key; and
      generate a third buffer entry using the third full key.

4. The data management device of claim 3, wherein the processor is further programmed to:
  make a third determination that the second test full key is the same as the third full key;
  in response to the third determination:
    remove all second entries of the buffer associated with second full keys having values less than the value of the second test full key to obtain a second smaller buffer; and
    process the second smaller buffer.

5. The data management device of claim 1, wherein the lookup key is associated with at least two full keys specified by the cookies.

6. The data management device of claim 5, wherein a first full key of the at least two full keys specified by the cookies is associated with first data stored in the remote storage.

7. The data management device of claim 6, wherein a second full key of the at least two full keys specified by the cookies is associated with second data stored in the remote storage.

8. A method of operating a data management device, comprising:
  identifying a crash of a remote storage while processing the buffer,
  in response to identifying the crash:
    obtaining cookies from the remote storage;
    calculating a lookup key using a full key specified by the cookies;
    obtaining a lowest value full key specified by the cookies as a test full key;
    generating a buffer entry using a value of the test full key;
    making a determination that the test full key is the same as the full key specified by the cookies;
    in response to the determination:
      removing all entries of a buffer associated with full keys having values less than the value of the test full key to obtain a smaller buffer; and
      processing the smaller buffer.

9. The method of claim 8, wherein generating the buffer entry using the value of the test full key comprises:
  calculating a difference between portions of a local snapshot and portions of a previous local snapshot that are both specified by the value of the test full key.

10. The method of claim 8, further comprising:
  identifying a second crash of a remote second storage while processing the buffer,
  in response to identifying the second crash:
    obtaining second cookies from the second remote storage;
    calculating a second lookup key using a second full key specified by the second cookies;
    obtaining a second lowest value full key specified by the second cookies as a second test full key;
    generating a second buffer entry using a value of the second test full key;
    making a second determination that the second test full key is different from the second full key specified by the second cookies;
    in response to the second determination:
      obtaining a third full key having a value that is greater than the value of the second test full key; and
      generating a third buffer entry using the third full key.

11. The method of claim 10, further comprising:
  making a third determination that the second test full key is the same as the third full key;
  in response to the third determination:
    removing all second entries of the buffer associated with second full keys having values less than the value of the second test full key to obtain a second smaller buffer; and
    processing the second smaller buffer.

12. The method of claim 8, wherein the lookup key is associated with at least two full keys specified by the cookies.

13. The method of claim 12, wherein a first full key of the at least two full keys specified by the cookies is associated with first data stored in the remote storage.

14. The method of claim 13, wherein a second full key of the at least two full keys specified by the cookies is associated with second data stored in the remote storage.

15. A non-transitory computer readable medium comprising computer readable program code, which when executed by a computer processor enables the computer processor to perform a method for operating a data management device, the method comprising:
  identifying a crash of a remote storage while processing the buffer,
  in response to identifying the crash:
    obtaining cookies from the remote storage;

calculating a lookup key using a full key specified by the cookies;

obtaining a lowest value full key specified by the cookies as a test full key;

generating a buffer entry using a value of the test full key;

making a determination that the test full key is the same as the full key specified by the cookies;

in response to the determination:

removing all entries of a buffer associated with full keys having values less than the value of the test full key to obtain a smaller buffer; and processing the smaller buffer.

16. The non-transitory computer readable medium of claim 15, wherein generating the buffer entry using the value of the test full key comprises:

calculating a difference between portions of a local snapshot and portions of a previous local snapshot that are both specified by the value of the test full key.

17. The non-transitory computer readable medium of claim 15, wherein the method further comprises:

identifying a second crash of a remote second storage while processing the buffer, in response to identifying the second crash:

obtaining second cookies from the second remote storage;

calculating a second lookup key using a second full key specified by the second cookies;

obtaining a second lowest value full key specified by the second cookies as a second test full key;

generating a second buffer entry using a value of the second test full key;

making a second determination that the second test full key is different from the second full key specified by the second cookies;

in response to the second determination:

obtaining a third full key having a value that is greater than the value of the second test full key; and generating a third buffer entry using the third full key.

18. The non-transitory computer readable medium of claim 17, wherein the method further comprises:

making a third determination that the second test full key is the same as the third full key;

in response to the third determination:

removing all second entries of the buffer associated with second full keys having values less than the value of the second test full key to obtain a second smaller buffer; and processing the second smaller buffer.

19. The non-transitory computer readable medium of claim 15, wherein the lookup key is associated with at least two full keys specified by the cookies.

20. The non-transitory computer readable medium of claim 19, wherein each of lookup key of the at least two full keys specified by the cookies is uniquely associated with data stored in the remote storage.

* * * * *